United States Patent
Fukuoka et al.

(10) Patent No.: US 8,774,107 B2
(45) Date of Patent: *Jul. 8, 2014

(54) RADIO COMMUNICATION SYSTEM, RADIO TRANSMISSION APPARATUS, AND RETRANSMISSION METHOD

(75) Inventors: Masaru Fukuoka, Ishikawa (JP); Akihiko Nishio, Kanagawa (JP); Kenichi Miyoshi, Kanagawa (JP)

(73) Assignee: Panasonic Corporation, Osaka (JP)

(*) Notice: Subject to any disclaimer, the term of this patent is extended or adjusted under 35 U.S.C. 154(b) by 642 days.

This patent is subject to a terminal disclaimer.

(21) Appl. No.: 12/293,516

(22) PCT Filed: Mar. 20, 2007

(86) PCT No.: PCT/JP2007/055685
§ 371 (c)(1),
(2), (4) Date: Sep. 18, 2008

(87) PCT Pub. No.: WO2007/108473
PCT Pub. Date: Sep. 27, 2007

(65) Prior Publication Data
US 2009/0168711 A1  Jul. 2, 2009

(30) Foreign Application Priority Data
Mar. 20, 2006 (JP) ................. 2006-076994

(51) Int. Cl.
*H04W 4/00* (2009.01)
*H04B 7/212* (2006.01)
*H04L 1/00* (2006.01)
*H04W 28/04* (2009.01)

(52) U.S. Cl.
CPC ............. *H04L 1/0003* (2013.01); *H04W 28/04* (2013.01)

USPC ............................................ 370/329; 370/322

(58) Field of Classification Search
CPC .......................... H04L 1/0003; H04W 28/04
USPC ....................................................... 370/329
See application file for complete search history.

(56) References Cited

U.S. PATENT DOCUMENTS

| | | | | |
|---|---|---|---|---|
| 5,625,875 | A * | 4/1997 | Whinnett et al. | 455/513 |
| 7,308,052 | B2 * | 12/2007 | Cheng et al. | 375/340 |
| 7,519,018 | B2 * | 4/2009 | Kwak | 370/320 |
| 2003/0123559 | A1 * | 7/2003 | Classon et al. | 375/260 |
| 2004/0081248 | A1 * | 4/2004 | Parolari | 375/259 |
| 2005/0192058 | A1 * | 9/2005 | Jung et al. | 455/562.1 |

(Continued)

OTHER PUBLICATIONS

International Search Report dated Jun. 5, 2007.

(Continued)

*Primary Examiner* — Gerald Smarth
(74) *Attorney, Agent, or Firm* — Dickinson Wright PLLC

(57) ABSTRACT

Provided is a retransmission method capable of improving reception quality in retransmission control. In this method, for the first transmission, LRB (Localized Resource Block) method is selected as a resource allocation method according to the CQI fed back from the mobile station. A frequency resource having the best reception quality according to the LRB format is allocated for the transmission data. For the second transmission, the same resource allocation method (LRB) as the first transmission is used and the transmission data is allocated fro the same frequency resource. For the third transmission, the resource allocation method is switched from the method of the first and the second transmission and transmission data is allocated to the frequency resource by using DRB (Distributed Resource Block) format.

16 Claims, 17 Drawing Sheets

(56) References Cited

U.S. PATENT DOCUMENTS

| | | | |
|---|---|---|---|
| 2006/0039318 A1* | 2/2006 | Oh et al. ............... | 370/328 |
| 2006/0078066 A1* | 4/2006 | Yun et al. .............. | 375/299 |
| 2006/0209970 A1* | 9/2006 | Kanterakis ............ | 375/259 |
| 2006/0233282 A1* | 10/2006 | Ota et al. ............... | 375/308 |
| 2007/0076670 A1* | 4/2007 | Kuchibhotla et al. ... | 370/336 |

OTHER PUBLICATIONS

3GPP RAN WG1 #42 meeting (Aug. 2005) R1-050884, "Physical Channel Structure and Procedure for Eutra Downlink," Aug. 2005, 9 pages total.

3GPP RAN WG1 LTE Adhoc meeting (Jan. 2006) R1-060103, "Downlink Synchronous Hybrid ARQ Scheme," Jan. 2006, 2 pages total.

3GPP RAN WG1 LTE Adhoc meeting (Jan. 2006) R1-060175, "Redundancy Version and Modulation Order for Synchronous HARQ," Jan. 2006 2 pages total.

3GPP TSG RAN WG1 #44 Meeting, R1-060286, Nokia, "Resource block allocation—mapping rules," [online], Feb. 9, 2006, full text [retrieved on May 22, 2007]. Retrieved from the Internet: <URL:http://www.3gpp.org/ftp/tsg_ran/WG1_RL1/TSGR144/Docs/R1-060286.zip>.

3GPP TSG RAN WG1 Ad Hoc, R1-050631, Huawei, "Motivation for localized and distributed subchannels in EUTRA—System Level Simulations," Jun. 16, 2005, full text [retrieved on May 22, 2007]. Retrieved from the Internet: <URL:http://www.3gpp.org/ftp/tsg_ran/WG1RL1/TSGR1 AH/LTE AHJune-05/Docs/R1-050631.zip>.

3GPP TSG RAN WG1 #42 Meeting, R1-050791, NEC Group, et al., "Performance Comparison of Distributed FDMA and Localized FDMA with Frequency Hopping for EUTRA Uplink," Aug. 25, 2005, full text [retrieved on May 22, 2007]. Retrieved from the Internet: <URL:http://www.3gpp.org/ftp/ tsgran/WG1 RL1/TSGR1 42/Docs/R1-050791.zip>.

3GPP TSG RAN1#44, "HARQ considerations for E-UTRA," Motorola, R1-060395, Feb. 13-17, 2006, pp. 1-5.

\* cited by examiner

| RETRANSMISSION ALLOCATION RESOURCE CONTROL SIGNAL | RESOURCE ALLOCATION SCHEME OF EACH NUMBER OF TRANSMISSIONS | | | |
|---|---|---|---|---|
| | 1 | 2 | 3 | 4 |
| 0 | LRB | LRB | LRB | LRB |
| 1 | LRB | LRB | LRB | DRB |
| 2 | LRB | LRB | DRB | DRB |
| 3 | LRB | DRB | DRB | DRB |

FIG.3

| PARAMETER CONTROL SIGNAL UPON RETRANSMISSION | MODULATION SCHEME OF EACH NUMBER OF TRANSMISSIONS | | | | ALLOCATION RESOURCE SCHEME OF EACH NUMBER OF TRANSMISSIONS | | | |
|---|---|---|---|---|---|---|---|---|
| | 1 | 2 | 3 | 4 | 1 | 2 | 3 | 4 |
| 0 | QPSK | QPSK | QPSK | QPSK | LRB | LRB | LRB | LRB |
| 1 | QPSK | QPSK | QPSK | QPSK | LRB | LRB | DRB | DRB |
| 2 | QPSK | QPSK | QPSK | QPSK | LRB | DRB | DRB | DRB |
| 3 | 16QAM | 16QAM | 16QAM | 16QAM | LRB | LRB | LRB | LRB |
| 4 | 16QAM | 16QAM | 16QAM | QPSK | LRB | LRB | LRB | DRB |
| 5 | 16QAM | 16QAM | QPSK | QPSK | LRB | LRB | DRB | DRB |
| 6 | 16QAM | QPSK | QPSK | QPSK | LRB | DRB | DRB | DRB |

FIG.9

| PACKET FORM REPORT SIGNAL | MODULATION SCHEME | CODING RATE | RESOURCE ALLOCATION SCHEME OF EACH NUMBER OF TRANSMISSIONS | | | |
|---|---|---|---|---|---|---|
| | | | 1 | 2 | 3 | 4 |
| 0 | QPSK | R=1/3 | LRB | DRB | DRB | DRB |
| 1 | QPSK | R=1/2 | LRB | LRB | DRB | DRB |
| 2 | QPSK | R=3/4 | LRB | LRB | LRB | DRB |
| 3 | 16QAM | R=1/2 | LRB | DRB | DRB | DRB |
| 4 | 16QAM | R=2/3 | LRB | LRB | DRB | DRB |
| 5 | 16QAM | R=3/4 | LRB | LRB | LRB | DRB |

FIG.10

RADIO COMMUNICATION SYSTEM, RADIO TRANSMISSION APPARATUS, AND RETRANSMISSION METHOD

TECHNICAL FIELD

The present invention relates to a radio communication system, radio transmitting apparatus and retransmission method.

BACKGROUND ART

With increased Internet traffic of recent years, there is an increasing demand for high-speed packet transmission techniques in mobile communication, and an OFDM (Orthogonal Frequency Division Multiplex) scheme is studied as one of the transmission schemes that realize high-speed packet transmission. The OFDM scheme can reduce degradation of performances due to multipath interference by transmitting data streams in parallel using a plurality of subcarriers and providing CP's (Cyclic Prefixes), and is robust against frequency selective fading by adopting error correcting coding.

It is studied to use resource allocation schemes such as an LRB (Localized Resource Block) and DRB (Distributed Resource Block) when this OFDM is applied in downlink and data for a plurality of mobile stations are frequency-domain-multiplexed on a plurality of subcarriers (for example, see Non-Patent Document 1).

With the LRB scheme, the base station performs the frequency scheduling to which subcarriers are allocated adaptively, based on the received quality of each frequency band in the mobile stations, so that it is possible to maximize the multiuser diversity effect and perform communication efficiently. Frequency scheduling is normally performed per resource block (RB) which puts together several neighboring subcarriers located approximately coherent frequency band adjacent to each other, into a block. Therefore, a frequency diversity effect can be hardly obtained.

By contrast with this, the DRB scheme allocates transmission data for the mobile stations in a distributed manner over the entire band of subcarriers, so that it is possible to obtain a high frequency diversity effect. Further, the DRB scheme allocates transmission data regardless of the received quality of each mobile station and therefore cannot obtain the frequency scheduling effect and the multiuser diversity effect as in the LRB scheme.

On the other hand, recently, synchronous HARQ is under study (for example, see Non-Patent Document 2). Synchronous HARQ is a hybrid-type packet retransmission control method (HARQ) that reports control information (transmission parameters) only upon the first transmission. Synchronous HARQ reports control information only upon the first transmission and therefore can reduce the overhead of control information upon retransmission.

Further, in Non-Patent Document 3, a retransmission control method for switching a modulation scheme per number of retransmissions in synchronous HARQ is under study.

Non-Patent Document 1: "Physical Channel Structure and Procedure for EUTRA Downlink", 3GPP RAN WG1 #42 meeting (2005.8) R1-050884

Non-Patent Document 2: "Downlink Synchronous Hybrid ARQ Scheme", 3GPP RAN WG1 LTE Adhoc meeting (2006.01) R1-060103

Non-Patent Document 3: "Redundancy Version and Modulation Order for Synchronous HARQ", 3GPP RAN WG1 LTE Adhoc meeting (2006.01) R1-060175

DISCLOSURE OF INVENTION

Problems to be Solved by the Invention

A case will be examined where synchronous HARQ is applied when the LRB scheme is used as the resource allocation scheme. FIG. 1 illustrates problems caused in this case.

The base station performs frequency scheduling upon the first transmission based on the received quality of each RB which is fed back from a mobile station, and allocates transmission data to frequency resource based on the LRB scheme. At this time, control information required for packet decoding is reported using an SCCH (shared control channel).

Upon receiving an error packet, the mobile station transmits a NACK signal to the base station.

When receiving the NACK signal from the mobile station, the base station transmits a retransmission packet (second transmission). At this time, the control information is not retransmitted. Further, the transmission is performed using the same RB as in the first transmission.

The mobile station combines the retransmitted packet and the packet in the first reception and decodes the packet. If a reception error is found also in this decoding, the mobile station transmits a NACK signal to the base station again.

When receiving the NACK signal from the mobile station, the base station transmits the retransmission packet again (third transmission). The control information is not retransmitted also at this time, and the transmission is performed using the same RB as in the first transmission.

However, the channel environment may fluctuate by a move of the mobile station or a change in the environment around the mobile station while retransmission is repeated. In this case, a difference occurs between the received quality of each RB fed back earlier from the mobile station, and the received quality in the second or third transmission. Therefore, if frequency is allocated to the packets, particularly, in the third transmission based on the received quality reported earlier, a sufficient combining gain cannot be obtained even if all packets are combined.

It is therefore an object of the present invention to provide a radio communication system, radio transmitting apparatus and retransmission method that can improve received quality in retransmission control.

Means for Solving the Problem

The radio communication system of the present invention adopts a configuration including: a selecting section that selects a localized resource block scheme or a distributed resource block scheme as a resource allocation scheme; and an allocating section that allocates transmission data to frequency resources according to the selected resource allocation scheme, and, in the radio communication system, when identical transmission data is transmitted several times, the selecting section switches the resource allocation scheme from the localized resource block scheme to the distributed resource block scheme upon transmission except a first transmission.

Here, the selecting section may be mounted on either the radio transmitting apparatus or the radio receiving apparatus in the radio communication system.

Advantageous Effect of the Invention

According to the present invention, it is possible to improve received quality in retransmission control.

BRIEF DESCRIPTION OF DRAWINGS

FIG. 3 shows an example of the data table inside an allocation resource table determining section according to Embodiment 1;

FIG. 9 shows a variation of a table for determining a resource allocation scheme switching timing;

FIG. 10 shows a variation of a table for determining a resource allocation scheme switching timing;

BEST MODE FOR CARRYING OUT THE INVENTION

Figure 1:
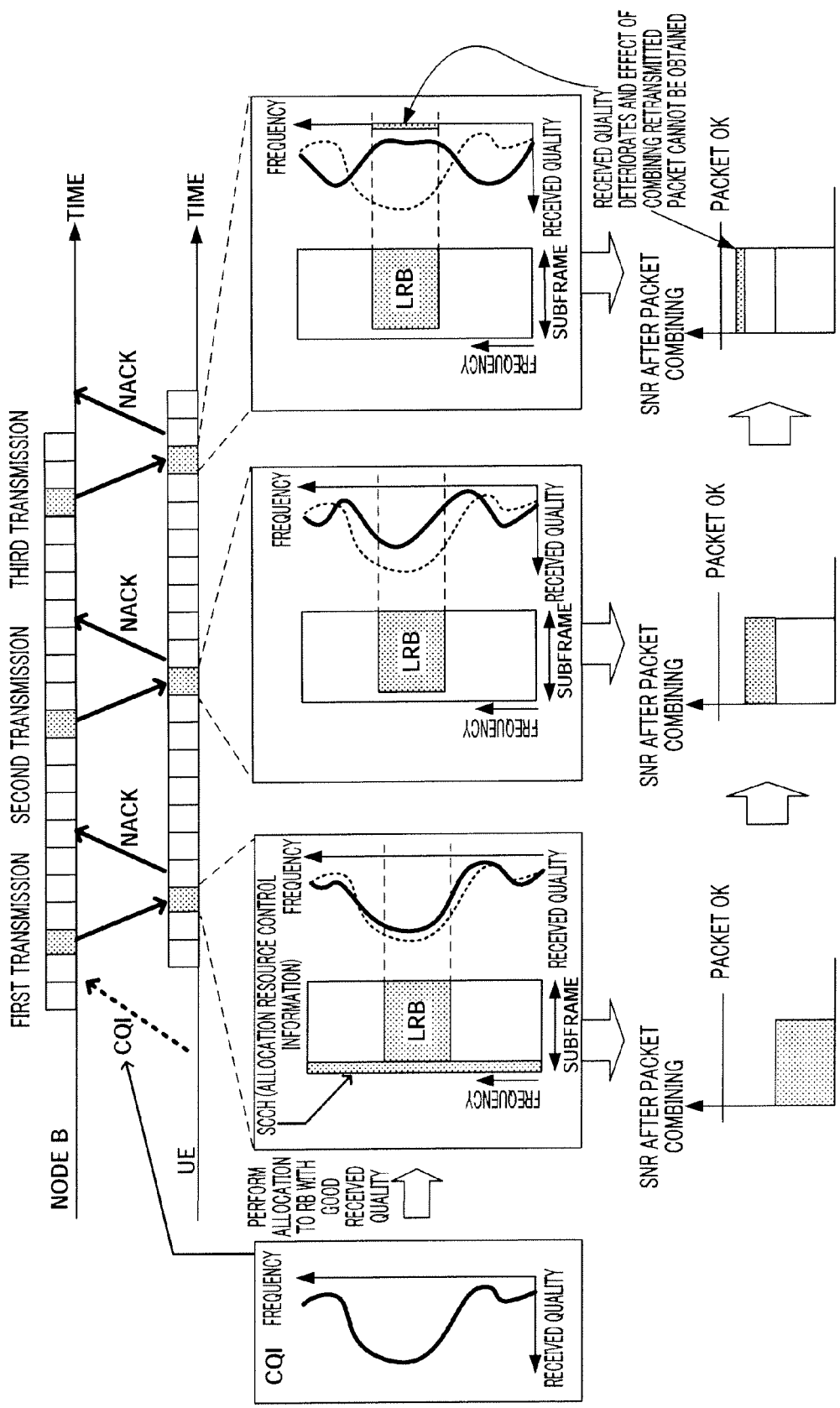
FIG. 1 illustrates the problem.

Embodiments of the present invention will be described in detail below with reference to the accompanying drawings. In the present description, a plurality of components having the same functions will be assigned the same reference numerals, and different branch numbers are assigned after the reference numerals to distinguish between the components.

Embodiment 1

Figure 2:
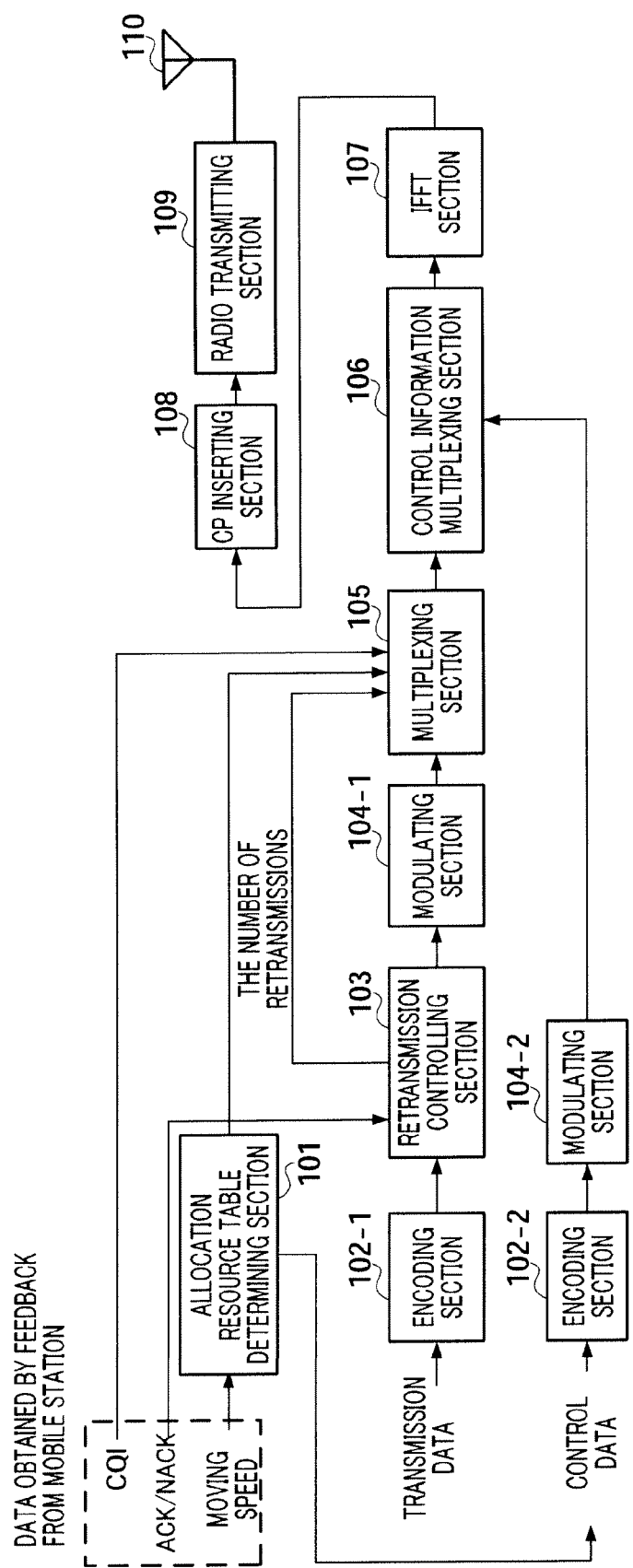
FIG. 2 is a block diagram showing the main configuration of the radio transmitting apparatus according to Embodiment 1 of the present invention.

FIG. 2 is a block diagram showing the main configuration of the radio transmitting apparatus according to Embodiment 1 of the present invention. Here, a case will be described as an example where the radio transmitting apparatus is used as a base station in a mobile communication system.

The radio transmitting apparatus according to the present embodiment has allocation resource table determining section 101, encoding sections 102-1 and 102-2, retransmission controlling section 103, modulating sections 104-1 and 104-2, multiplexing section 105, control information multiplexing section 106, IFFT section 107, CP inserting section 108, radio transmitting section 109 and antenna 110, and these sections perform the following operations.

Encoding section 102-1 performs error correcting encoding such as turbo encoding on transmission data and outputs the result to retransmission controlling section 103. Encoding section 102-2 also performs error correcting encoding such as turbo encoding on control data and outputs the result to modulating section 104-2.

Retransmission controlling section 103 buffers bits subjected to turbo encoding in an internal memory and controls whether to output a new packet to modulating section 104-1 or output a retransmission packet stored in the internal memory to modulating section 104-1, based on an ACK/NACK signal fed back from the mobile station. Further, retransmission controlling section 103 counts the number of retransmissions and reports the number to multiplexing section 105.

Modulating section 104-1 performs predetermined modulating processing such as QPSK and 16QAM on a symbol, which is outputted from retransmission controlling section 103 and which is to be multiplexed on a transmission subframe, and outputs the result to multiplexing section 105. Modulating section 104-2 performs modulation such as QPSK and 16QAM on encoded data outputted from encoding section 102-2 and outputs the result to control information multiplexing section 106.

Allocation resource table determining section 101 generates a retransmission allocation resource control signal showing a resource allocation method using moving speed information fed back from the mobile station with reference to an internal data table, and outputs the signal to multiplexing section 105 and encoding section 102-2. FIG. 3 shows an example of the data table. In this table, the correspondence relationships between the resource allocation schemes (i.e., LRB scheme and DRB scheme) of each number of retransmissions and retransmission allocation resource control signals, are determined in advance. For example, when the resource allocation schemes for the first, second, third and fourth transmissions are determined to be LRB, LRB, DRB and DRB, respectively, based on the moving speed (i.e., hatching part), allocation resource table determining section 101 outputs retransmission allocation resource control signal #2.

Multiplexing section 105 allocates modulated data outputted from modulating section 104-1 to a plurality of frequency resources, performs frequency-domain-multiplexing on the transmission data and outputs the multiplexed signal to control information multiplexing section 106. Here, multiplexing section 105 allocates the frequency resources using the CQI information fed back from the mobile station, according to the resource allocation scheme of each number of retransmissions specified by the retransmission allocation resource control signal.

Control information multiplexing section 106 checks the subframe numbers, and, when a subframe is the head subframe, multiplexes predetermined control information and outputs the multiplexed signal to IFFT section 107.

IFFT section 107 performs inverse fast Fourier transform (IFFT) processing on the multiplexed signal to generate an OFDM symbol converted to the time domain and outputs the symbol to CP inserting section 108.

CP inserting section 108 duplicates the rear part of the OFDM symbol outputted from IFFT section 107 as a CP, inserts the CP to the head part and outputs the result signal to radio transmitting section 109.

Radio transmitting section 109 performs predetermined radio transmission processing such as D/A conversion and power amplification on the signal after the CP is inserted, generates a radio signal and transmits the signal via antenna 110.

Figure 4:
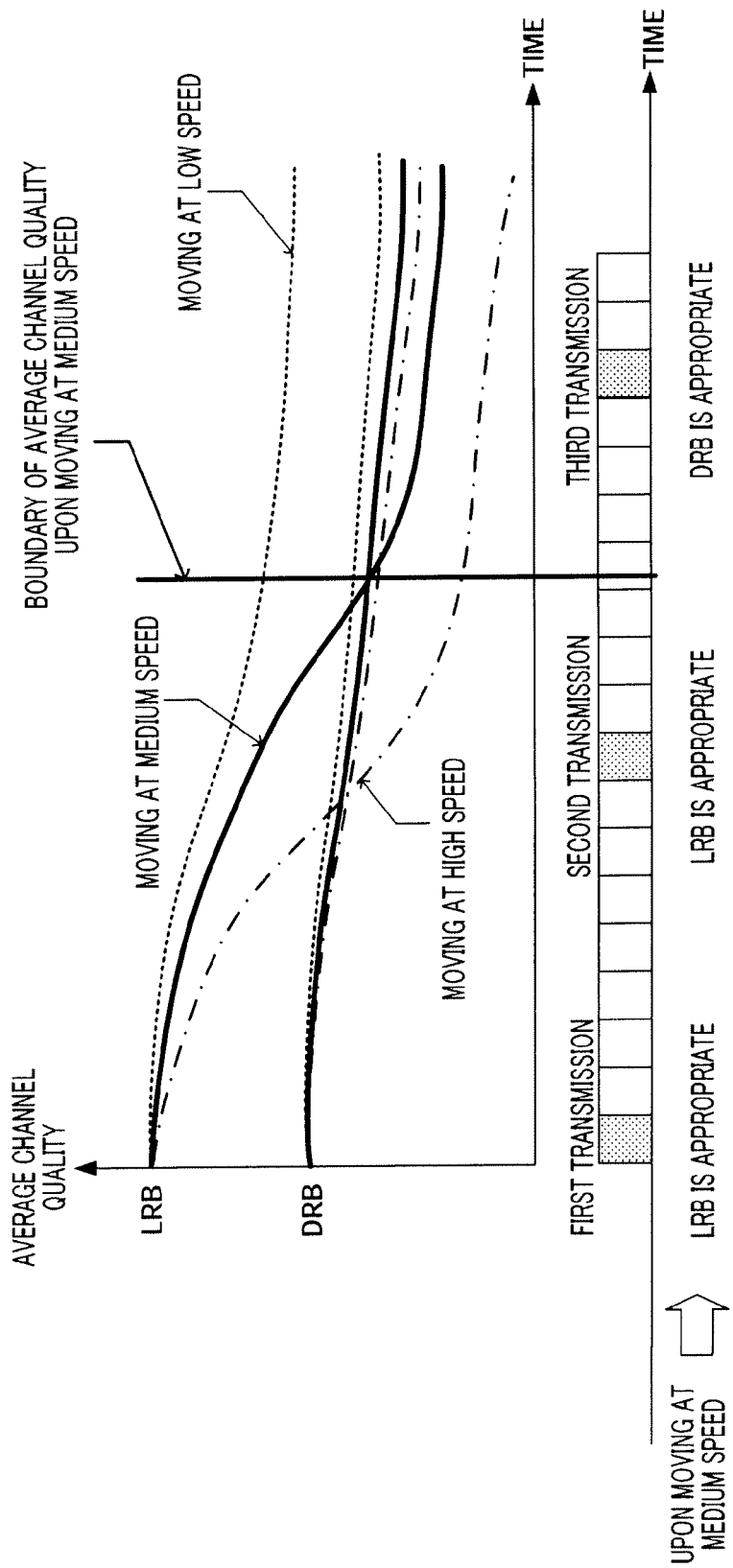
FIG. 4 illustrates the basic operation of the allocation resource table determining section according to Embodiment 1.

Next, the operation of allocation resource table determining section 101 will be described in more detail. FIG. 4 illustrates the basic operation of allocation resource table determining section 101.

Based on the moving speed fed back from the mobile station, the speed of channel fluctuation can be predicted. The graph in the figure shows the calculated average channel quality of each band when the LRB scheme or DRB scheme is used. Allocation resource table determining section 101 specifies from this graph, the number of transmissions where the average channel quality in the band of the DRB scheme is higher than the average channel quality in a band of the LRB scheme. That is, the position of the boundary where the frequency diversity effect exceeds the frequency scheduling effect, is calculated. FIG. 4 shows the boundary upon move at medium speed. The number of transmissions that follows the boundary in the time domain becomes the number of transmissions at which the resource allocation scheme should be switched. Therefore, allocation resource table determining section 101 reports the retransmission allocation resource control signal determined based on the table shown in FIG. 3, to multiplexing section 105 and encoding section 102-2 as control information.

Figure 5:
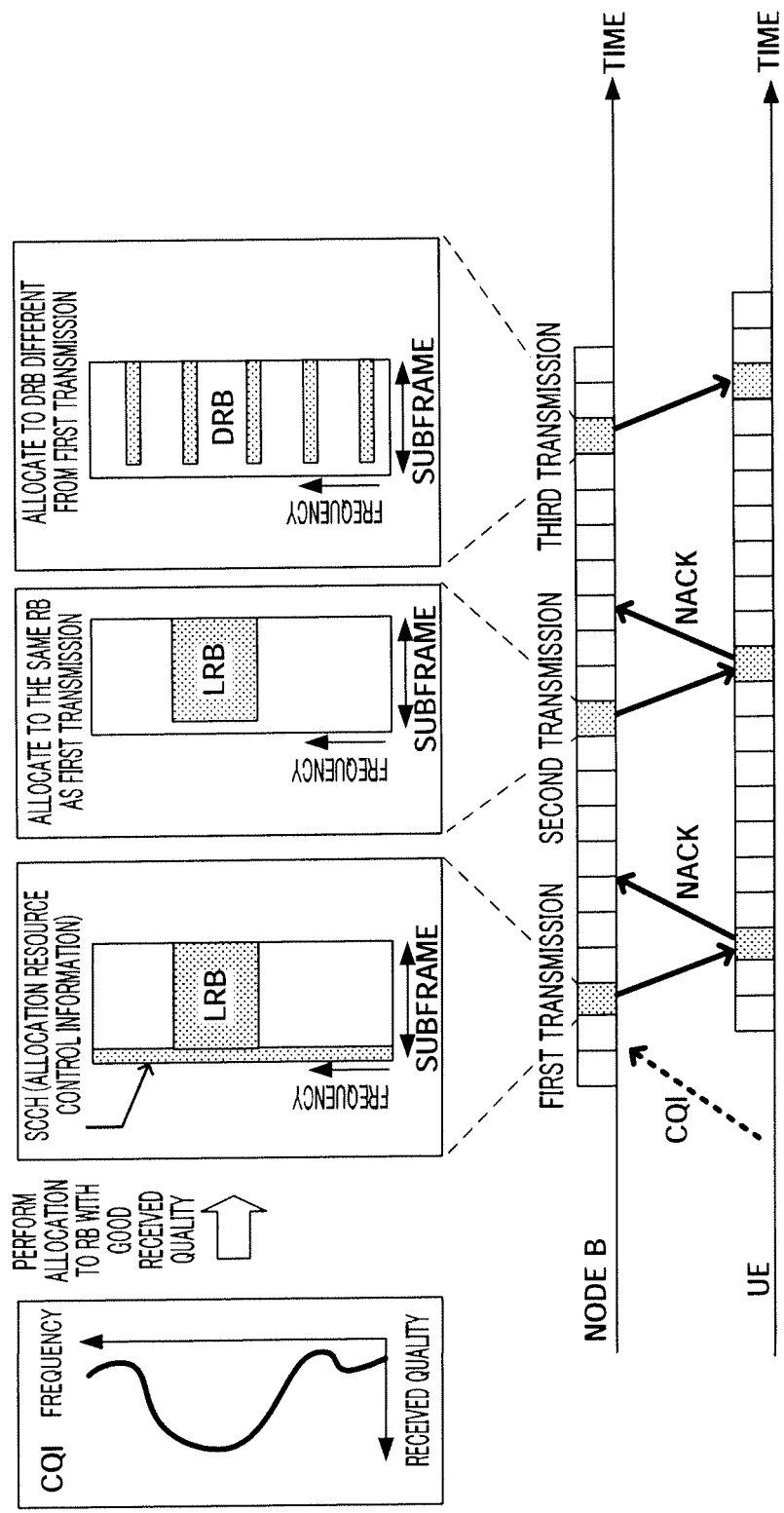
FIG. 5 illustrates a signal transmitted from the radio transmitting apparatus according to Embodiment 1.

FIG. 5 illustrates the signal transmitted by the above operation from the radio transmitting apparatus according to the present embodiment. Here, "2" is assumed to be selected as the retransmission allocation resource control signal.

Figure 6:
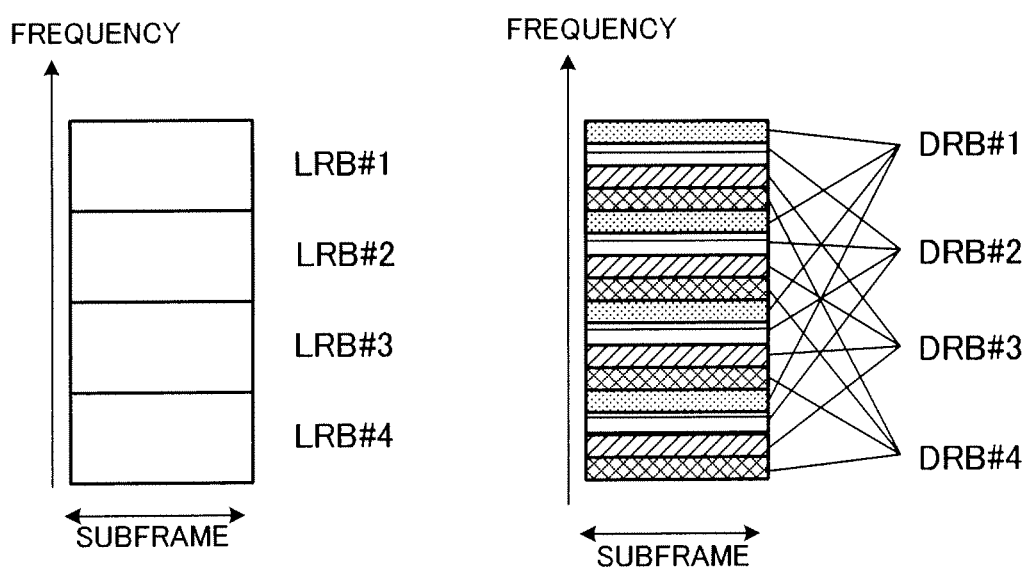
FIG. 6 illustrates LRB numbers and DRB numbers.

In the first transmission, the LRB is selected as the resource allocation scheme based on the CQI fed back from the mobile station, and the RB with the best received quality is allocated to the transmission data according to the LRB scheme. Here, as the control information, a retransmission allocation resource control signal, LRB number and DRB number together with an MCS (Modulation and Coding Scheme) and coding rate, are multiplexed on a control channel SCCH. As shown in FIG. 6, the LRB number and DRB number refer to the numbers for distinguishing between four resource allocation methods according to the resource allocation scheme, for example, LRB#1 to #4 when the resource allocation scheme is the LRB scheme, and, more specifically, show the position of an RB to which the transmission data is actually allocated.

In the second transmission (first retransmission), the retransmission allocation resource control signal shows "2," and therefore multiplexing section 105 allocates the transmission data to the same RB using the same resource allocation scheme (LRB) as in the first transmission.

In the third transmission (second retransmission), the retransmission allocation resource control signal shows "2," and therefore multiplexing section 105 switches to a different resource allocation scheme from the first transmission and the second transmission, and allocates the transmission data to the RB using the DRB scheme.

In this way, the radio transmitting apparatus according to the present embodiment uses the LRB scheme as the resource allocation scheme upon the first transmission in retransmission control of transmission data, and switches the resource allocation scheme to the DRB scheme during retransmissions in a plurality of retransmissions, to perform transmission. Further, the switching timing is changed adaptively based on the moving speed of the mobile station.

Next, the radio receiving apparatus (mobile station) according to the present embodiment matching the radio transmitting apparatus (base station) according to the above present embodiment will be described in detail.

Figure 7:
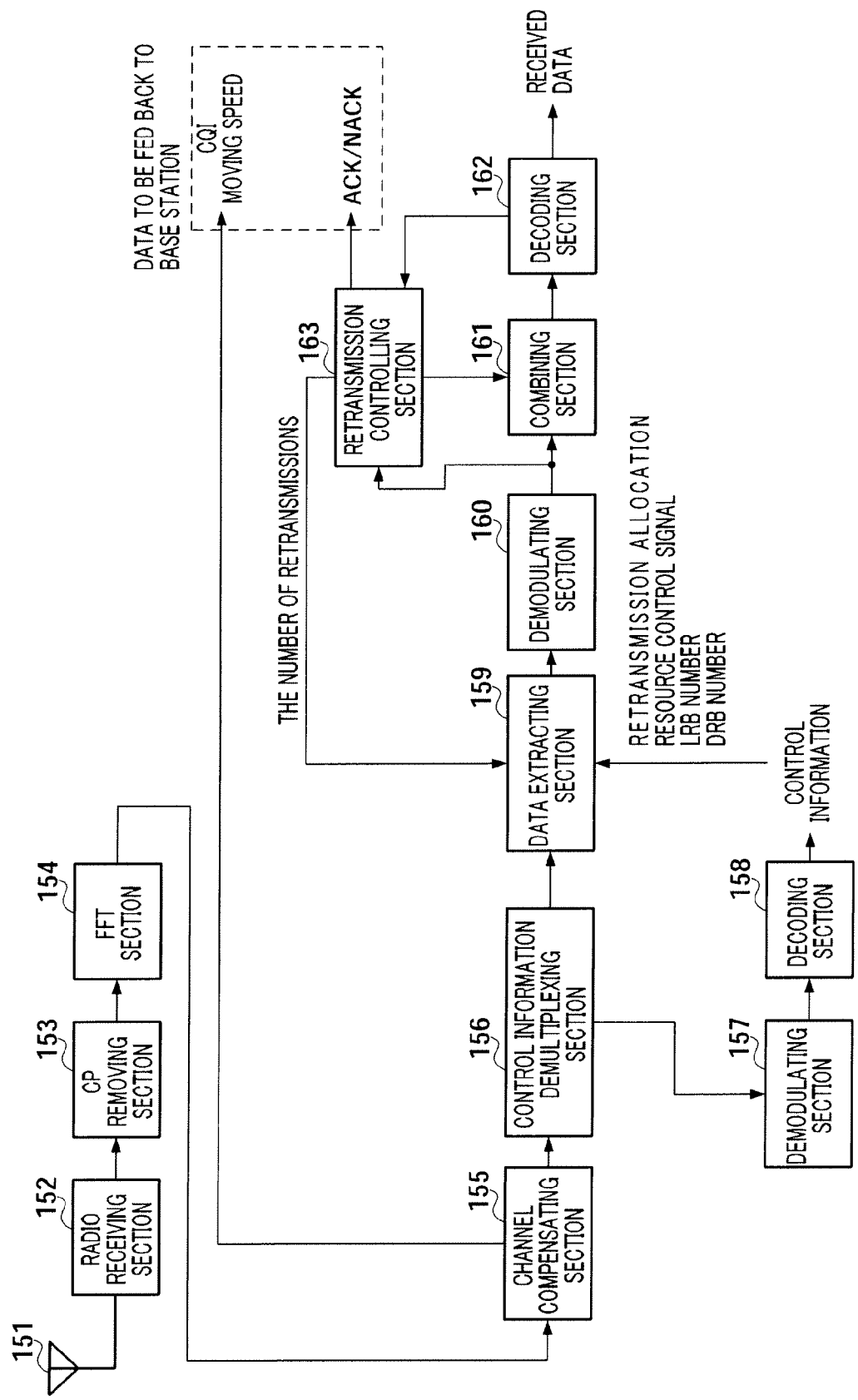
FIG. 7 is a block diagram showing the main configuration of the radio receiving apparatus according to Embodiment 1.

FIG. 7 is a block diagram showing the main configuration of the radio receiving apparatus according to the present embodiment.

The radio receiving apparatus according to the present embodiment has antenna 151, radio receiving section 152, CP removing section 153, FFT section 154, channel compensating section 155, control information demultiplexing section 156, demodulating section 157, decoding section 158, data extracting section 159, demodulating section 160, combining section 161, decoding section 162 and retransmission controlling section 163, and the sections perform the following operations.

Radio receiving section 152 performs predetermined radio receiving processing such as down-conversion and A/D conversion on a signal received via antenna 151 and outputs the obtained baseband signal to CP removing section 153.

CP removing section 153 removes the CP added to the received signal and outputs the signal after the CP is removed to FFT section 154.

FFT section 154 performs fast Fourier transform (FFT) processing on a per OFDM symbol basis, to convert the received signal to a frequency domain and outputs the frequency domain signal to channel compensating section 155.

Channel compensating section 155 performs channel estimation from the received pilot symbol of the frequency domain signal, compensates for the received signal using the obtained channel estimation value and outputs the compensated signal to control information demultiplexing section 156. Further, channel compensating section 155 measures the moving speed and CQI from the channel estimation value and outputs them separately.

Control information demultiplexing section 156 demultiplexes the symbols on which control information is multiplexed, from the compensated signal, outputs the symbols on which control information is mapped to demodulating section 157 and outputs the other symbols to data extracting section 159.

Demodulating section 157 performs predetermined demodulation processing such as QPSK and 16QAM on the symbols on which control information is mapped and outputs the demodulated signal to decoding section 158.

Decoding section 158 performs decoding processing such as turbo decoding on the demodulated signal to obtain control data and outputs a retransmission allocation resource control signal, LRB number and DRB number to data extracting section 159.

Data extracting section 159 extracts a data symbol from the output signal of control information demultiplexing section 156 using the retransmission allocation resource control signal, LRB number, DRB number and the number of retransmissions and outputs the data symbol to demodulating section 160.

Demodulating section 160 performs predetermined demodulating processing such as QPSK and 16QAM on the extracted data symbol and outputs the demodulated signal to combining section 161 and retransmission controlling section 163.

When reported from retransmission controlling section 163 that the input signal is a retransmitted packet, combining section 161 combines the buffered received data and currently received data and outputs the combined signal to decoding section 162.

Decoding section 162 performs decoding processing such as turbo decoding on the signal outputted from combining section 161 and obtains received data. The decoded data is also outputted to retransmission controlling section 163.

Retransmission controlling section 163 performs, for example, a CRC on the decoded data and determines whether this packet has been received erroneously or correctly. When this packet has been received correctly, an ACK signal is fed back to the base station, and, when this packet has been received erroneously, a NACK signal is fed back to the base station as a retransmission request. Further, retransmission controlling section 163 passes the received data to combining section 161. Still further, retransmission controlling section 163 counts the number of retransmissions and passes the number to data extracting section 159.

Figure 8:
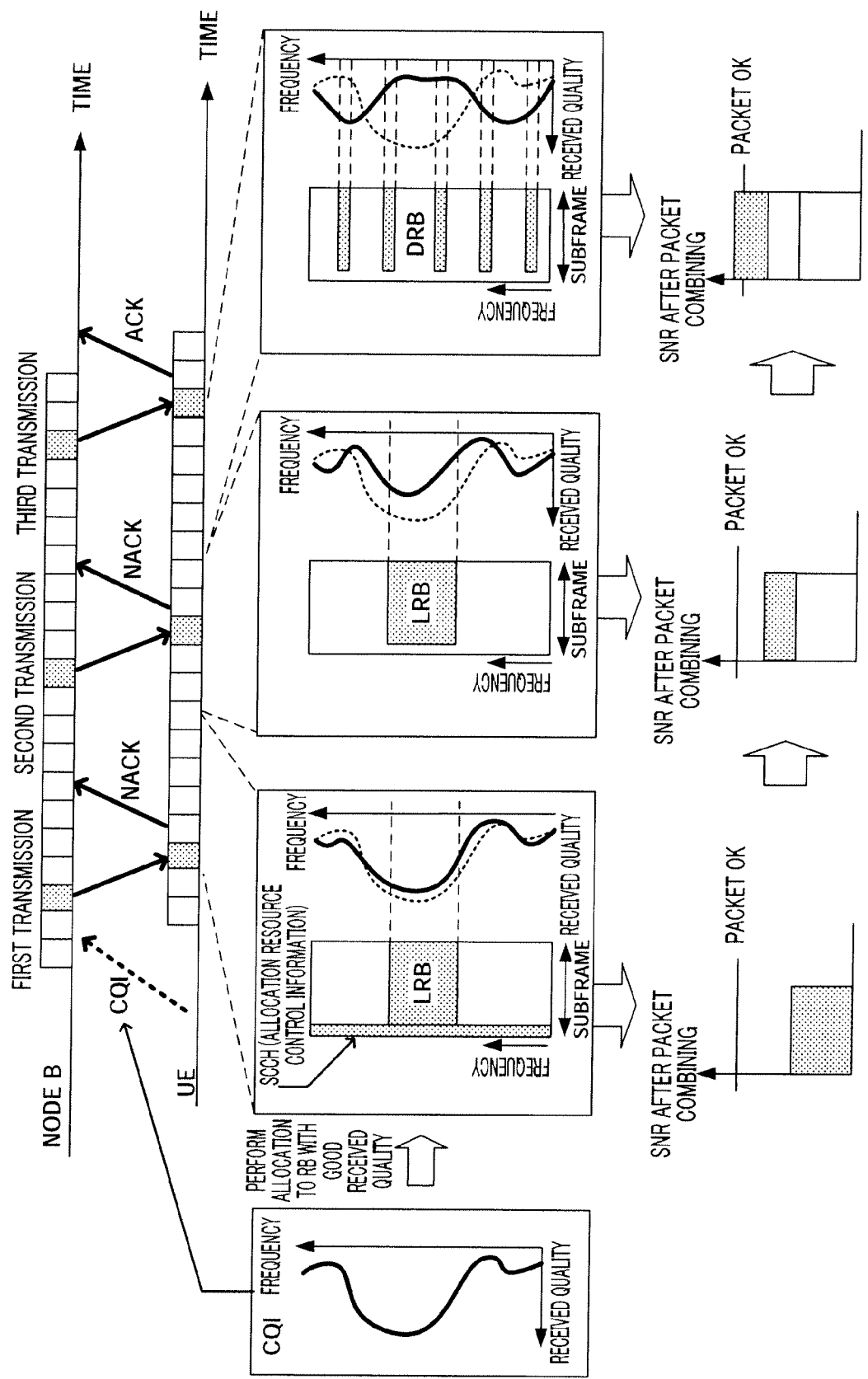
FIG. 8 illustrates reception processing and reception performance of the radio receiving apparatus according to Embodiment 1.

FIG. 8 illustrates reception processing and reception performance of the radio receiving apparatus according to the present embodiment having the above configuration. FIG. 8 assumes that "2" is selected as the retransmission allocation resource control signal.

In the first transmission, first, by demodulating the control channel SCCH arranged in the head of the subframe, control data is obtained. The retransmission allocation resource control signal, LRB number and DRB number included in the control data is acquired and stored in the internal memory. Here, the retransmission allocation resource control signal shows "2," and so data extracting section 159 determines that the resource allocation scheme is the LRB based on the internal table (see FIG. 3). The RB to which data is actually allocated, is specified from the LRB number inputted separately, and a data symbol is extracted from this RB. Demodulating section 160 demodulates data of, for example, QPSK and 16QAM and calculates the likelihood of each bit. This transmission is the first transmission, and so combining section 161 does not perform combining. Decoding section 162 performs error correcting decoding of the likelihood of each bit using, for example, turbo decoding. Retransmission controlling section 163 performs a CRC check of the decoded data. Here, the packet is assumed to be received erroneously. Therefore, retransmission controlling section 163 feeds back a NACK signal to the base station as a retransmission request and buffers the likelihood of each bit.

In the second transmission, the retransmission allocation resource control signal shows "2," and therefore data extracting section 159 determines that the resource allocation scheme of this time is also the LRB, distinguishes the RB on which a data symbol is multiplexed, based on the LRB number inputted separately, and extracts the data symbol. Packets are decoded in the same way as in the first transmission and combined. Also in this case, the packets are assumed to be received erroneously. Therefore, retransmission controlling section 163 feeds back a NACK signal to the base station as a retransmission request and buffers the likelihood of each bit.

In the third transmission, the retransmission allocation resource control signal shows "2," and therefore data extracting section 159 determines that the resource allocation scheme of this time is the DRB, distinguishes the RB on which a data symbol is multiplexed, based on the LRB number inputted separately, and extracts the data symbol. Packets are decoded in the same way as in the first and second transmission and combined. Here, the packets are assumed to be received correctly. Therefore, retransmission controlling section 163 feeds back an ACK signal to the base station.

As shown in FIG. 8, in the third transmission, the difference between the received quality reported in the CQI and the actual real-time received quality is large. However, in the present embodiment, the LRB scheme is used as the resource allocation scheme in the first and second transmission, and the DRB scheme is used in the third transmission which is during retransmissions. Therefore, in the third transmission, the frequency diversity gain can be obtained, and so the received quality does not degrade substantially.

In this way, the radio receiving apparatus according to the present embodiment can improve reception performance by receiving a signal transmitted from the radio transmitting apparatus according to the present embodiment and performing the above operations.

As described above, according to the present embodiment, the radio transmitting apparatus switches the resource allocation scheme from the LRB to the DRB during retransmissions according to a predetermined rule. Therefore, even if the channel environment fluctuates and frequency allocation performed using the first transmission as a reference becomes inadequate upon retransmission, it is possible to obtain a diversity effect by using the DRB scheme and prevent degradation of received quality. In other words, the present embodiment is characterized in that the resource allocation scheme is switched from the LRB to the DRB at a timing at which the frequency scheduling effect starts decreasing.

Further, according to the present embodiment, the resource allocation scheme switching timing (specifically, the number of transmissions or the number of retransmissions) is adjusted according to the moving speed of the mobile station. Therefore, even when the channel state fluctuates variously, it is possible to respond to this and prevent degradation of reception performance.

Although a configuration has been described as an example with the present embodiment where the table shown in FIG. 3 is used to determine the resource allocation scheme switching timing, it is also possible to adopt a configuration where the table shown in FIG. 9 is used. In this table, modulation schemes of each number of transmissions and resource allocation schemes of each number of transmissions are associated. That is, modulation schemes are added to the table shown in FIG. 3 as parameters. By this means, when the moving speed of the mobile station is determined, the resource allocation scheme and modulation scheme of each number of transmissions are determined, and a "parameter control signal upon retransmission" matching this is selected. By this means, the modulation scheme can be changed at the same time in synchronization with switching of the resource allocation scheme, so that it is possible to obtain the combining gain of a retransmission packet and improve the frequency diversity effect.

Further, it is also possible to adopt a configuration of using the table shown in FIG. 10 as the table for determining the resource allocation scheme switching timing. In this table, in addition to the resource allocation schemes and modulation schemes, coding rates are associated. If the moving speed of the mobile station is determined, a "packet form report signal" matching the parameters is selected. By performing control based on this table, for example, in the same modulation scheme, when the coding rate is lower, the resource allocation scheme is shifted to the DRB scheme with a smaller number of retransmissions. Therefore, it is possible to obtain a higher frequency diversity effect. That is, based on the fact that a higher frequency diversity effect can be obtained when the coding rate is lower, the reception performances are improved by switching the resource allocation scheme to the DRB scheme earlier when the coding rate is lower.

Figure 11:
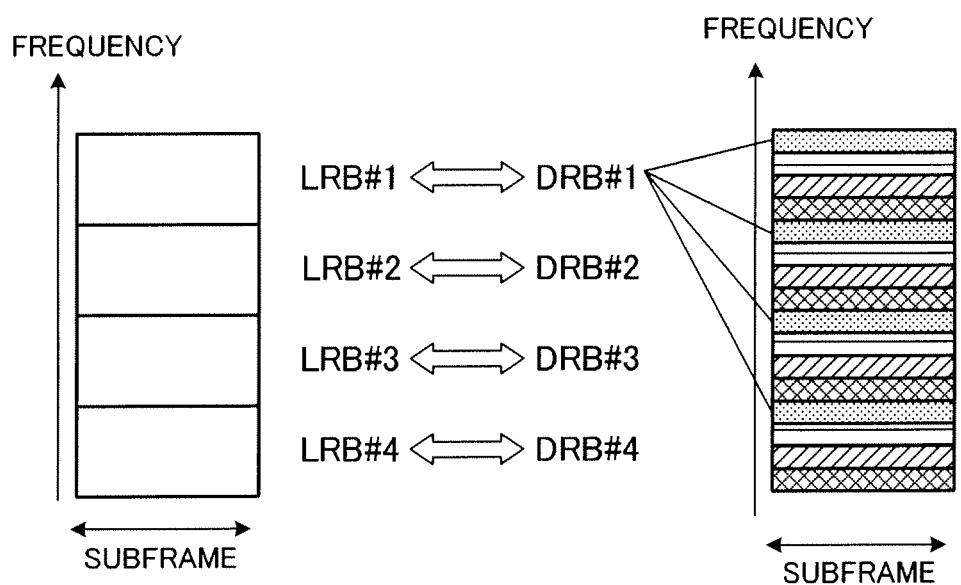
FIG. 11 shows an example of correspondence between the LRB numbers and the DRB numbers.

Further, although a configuration has been described as an example with the present embodiment where both the LRB number and DRB number are multiplexed on the SCCH and transmitted as control information in the first transmission, it is also possible to adopt a configuration where the radio transmitting apparatus reports only the LRB number to the radio receiving apparatus by setting the LRB numbers and DRB numbers in advance so as to associate with each other one-on-one. FIG. 11 shows an example of the correspondence between the LRB numbers and DRB numbers. By this means, the radio transmitting apparatus only has to report the LRB number, and so can reduce control information, and the radio receiving apparatus can recognize the DRB number from the reported LRB number.

Further, in the present embodiment, when retransmissions are performed a plurality of times after switching to the DRB scheme, the following resource allocation method can be applied.

Figure 12:
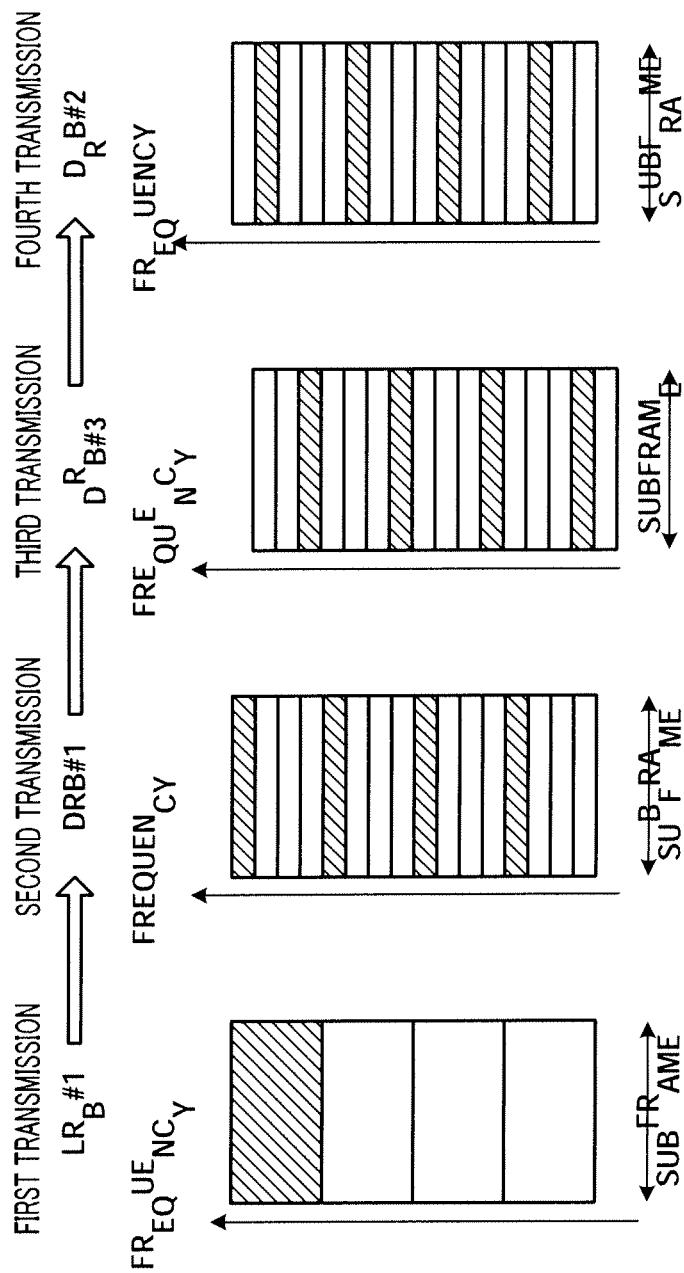
FIG. 12 shows an example of the resource allocation method of the DRB scheme.

FIG. 12 shows an example of the resource allocation method of the DRB scheme. In this way, the position where frequency resource is allocated in the DRB scheme is changed per number of transmissions. For example, transmission data is allocated to different DRB numbers between the second transmission and the third transmission. By this means, it is possible to obtain a higher frequency diversity effect.

Figure 13:
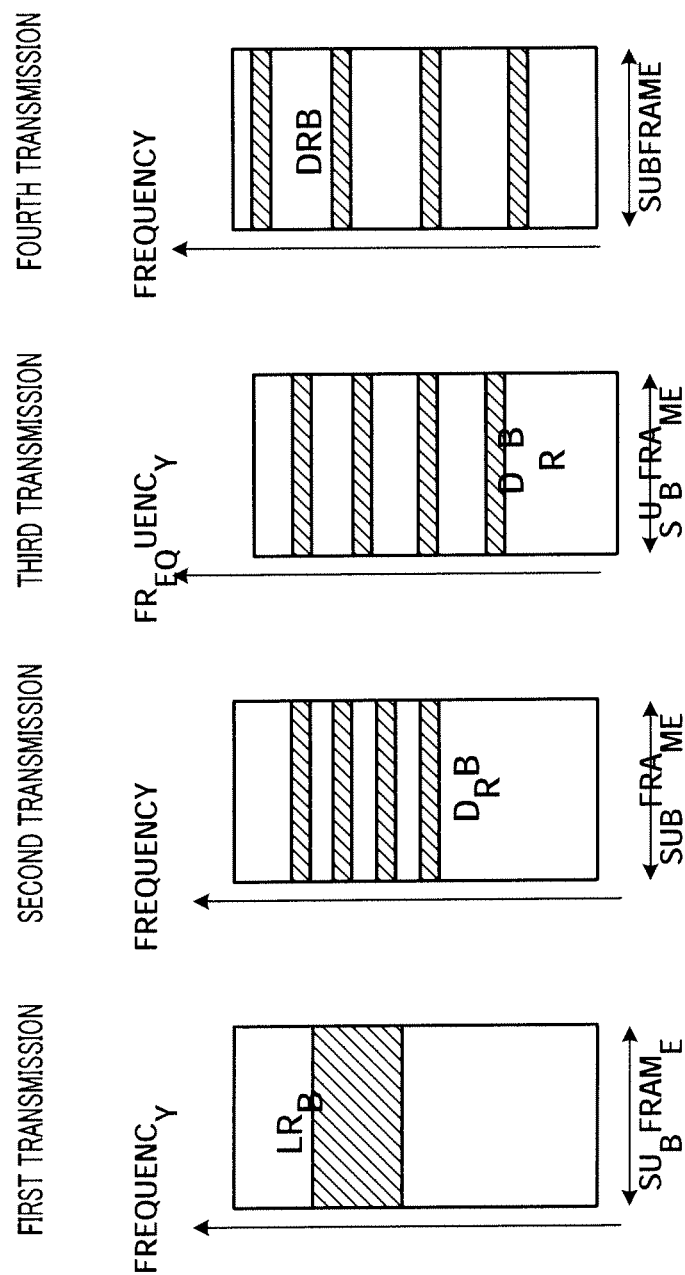
FIG. 13 shows another variation of the resource allocation method of the DRB scheme.

FIG. 13 shows another variation of the resource allocation method of the DRB scheme. Here, in the second transmission after the resource allocation scheme is switched to the DRB scheme, resource is allocated to the frequency position in the range near the range for the LRB scheme. When the number of transmissions increases (according to the time passed), frequency resources are distributed in a greater range in the DRB scheme. By this means, it is possible to shift from the LRB scheme to the DRB scheme gradually.

Further, although a configuration has been described as an example with the present embodiment where a common table is used between transmission side and reception side to switch the resource allocation scheme, it is also possible to adopt a configuration where the radio transmitting apparatus reports only the number of transmissions (or the number of retransmissions), which will be the resource allocation scheme switching timing, as control information, to the radio receiving apparatus.

Further, although a configuration has been described as an example with the present embodiment where the resource allocation scheme switching timing is determined according to the moving speed of the mobile station, it is also possible to adopt a configuration where the resource allocation scheme switching timing is fixed from the design phase.

Figure 14:
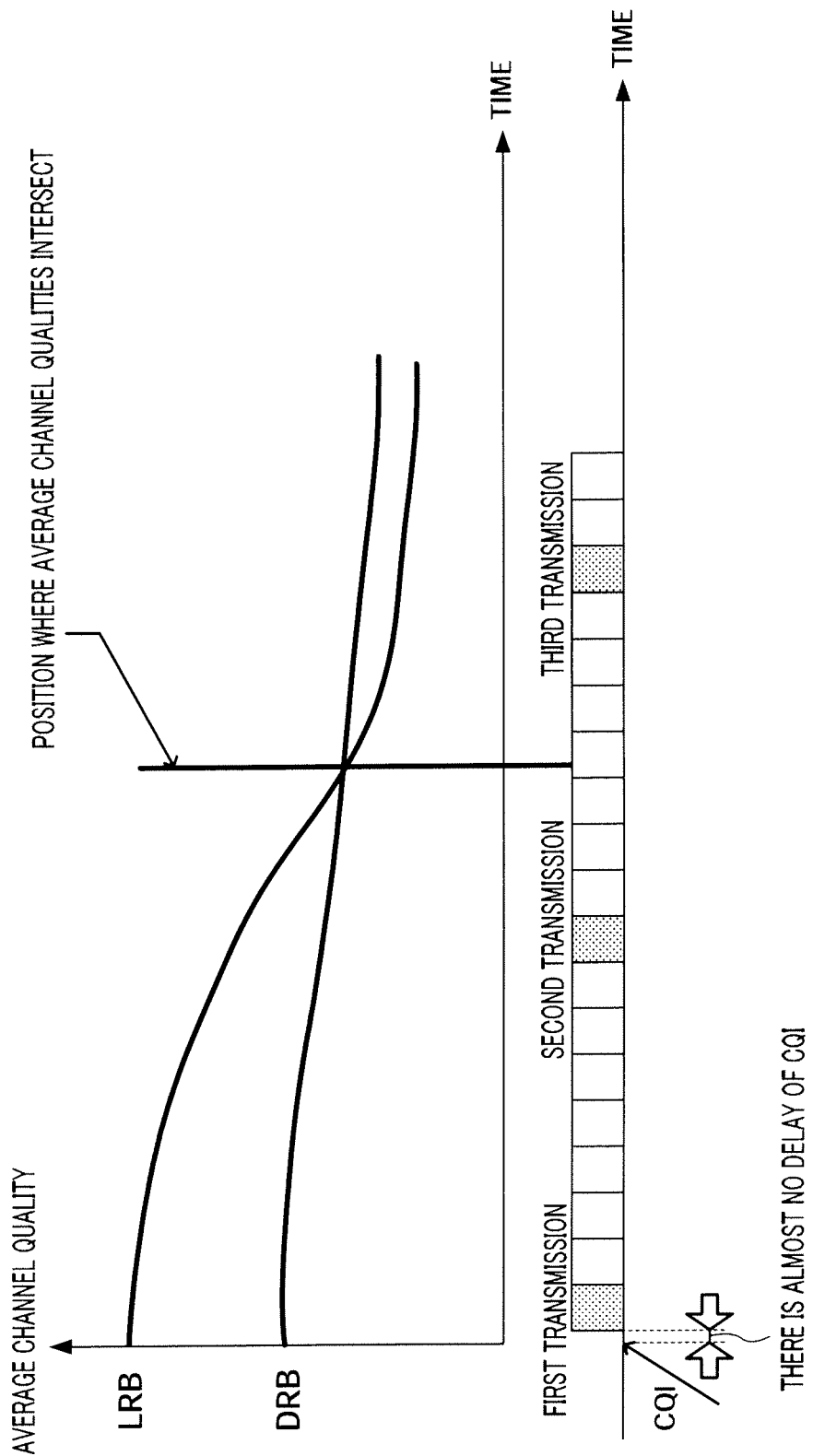
FIG. 14 shows that the average channel quality fluctuates depending on a CQI receiving timing.
Figure 15:
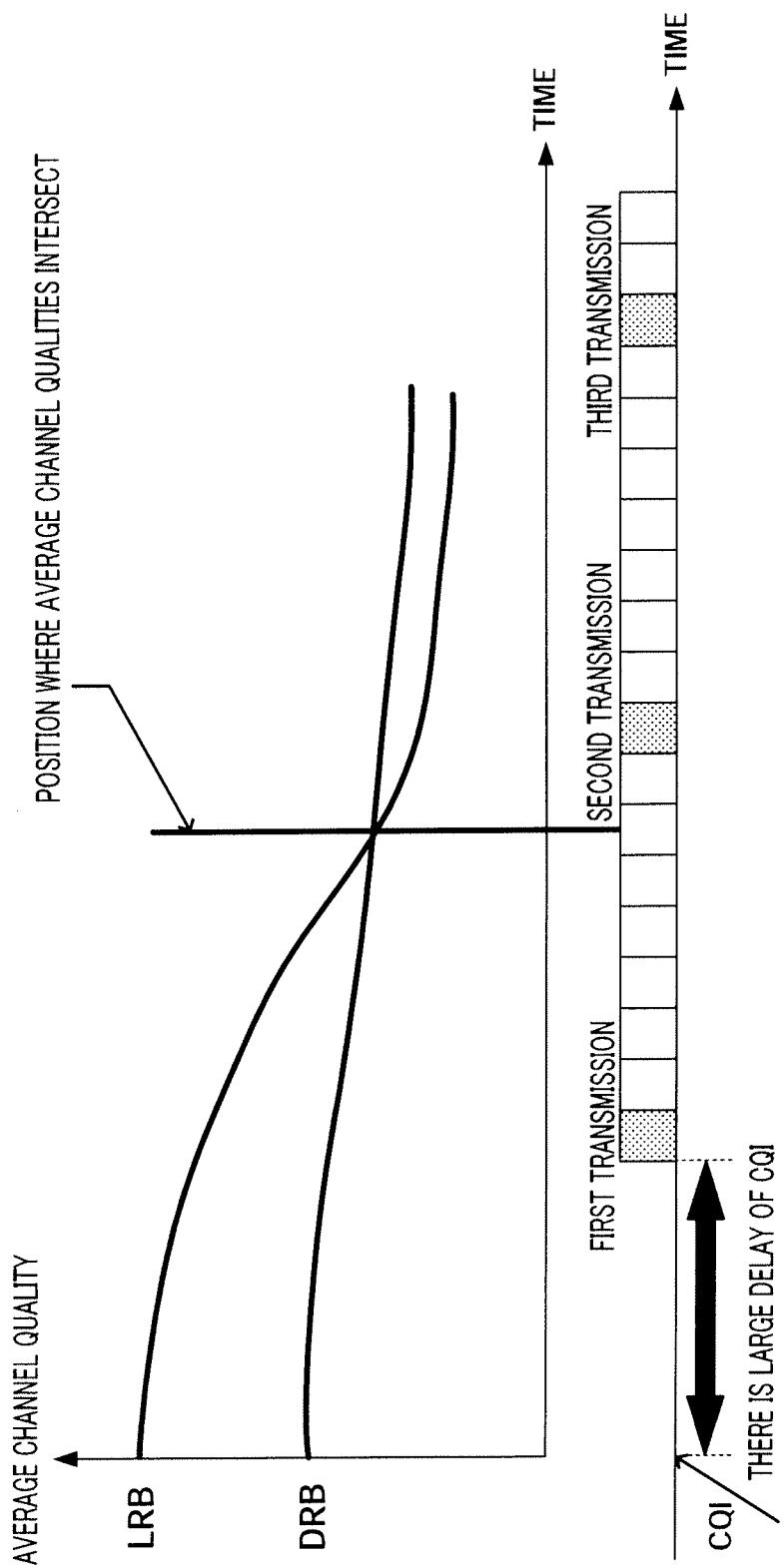
FIG. 15 shows that the average channel quality fluctuates depending on a CQI receiving timing.

Further, although a configuration has been described as an example with the present embodiment where the resource allocation scheme switching timing is determined based on only the moving speed of the mobile station, it is also possible to adopt a configuration where this switching timing is determined based on the time interval from the CQI fed back from the mobile station, that is, the delay time from the CQI reception timing. Further, it is also possible to adopt a configuration where the switching timing determined based on the moving speed of the mobile station is corrected based on the delay time from the CQI reception timing, because, when the delay time from the CQI reception timing is large, the average received quality is more likely to fluctuate. FIG. 14 and FIG. 15 show the average channel quality which fluctuates by a difference of the CQI reception timing. Here, a case is shown as an example where the mobile station moves at a medium speed. As shown in these figures, when the time intervals from the CQI reception timing becomes larger, the average channel quality deteriorates. Particularly, the performances of the LRB scheme degrade more significantly than that of the DRB scheme. Therefore, as a variation of the present embodiment, the time when the performance curve of the LRB scheme intersects with the performance curve of the DRB scheme (the position where the average channel qualities intersect), that is, the time when the performances of the LRB scheme and the DRB scheme switch, is set as the switching timing. By this means, the switching timing becomes optimum, so that it is possible to prevent degradation of the reception performance. It is also possible to adopt a configuration where this control is performed based on BLER (outer loop control) in the mobile station, that is, ACK/NACK information transmitted from the mobile station to the base station.

Embodiment 2

A case will be described as an example also with Embodiment 2 of the present invention where the radio transmitting apparatus according to the present embodiment is used as the base station in the mobile communication system.

In Embodiment 1, the base station switches the resource allocation scheme from the LRB to the DRB during retransmissions according to the predetermined table. In Embodiment 2, a configuration will be described where the resource allocation scheme switching timing is reported in real time and the packet combining gain is obtained even when the channel environment fluctuates.

The basic configuration of the radio transmitting apparatus according to the present embodiment is the same as the radio transmitting apparatus (see FIG. 2) described in Embodiment 1, and so a block diagram, for example, will not be shown. The difference is that allocation resource table determining section 101 outputs "the number of retransmissions for reallocation" instead of a "retransmission allocation resource control signal." This number of retransmissions for reallocation is used to issue a command to switch the resource allocation scheme when the number of transmissions is equivalent to the number of retransmissions for reallocation.

Figure 16:
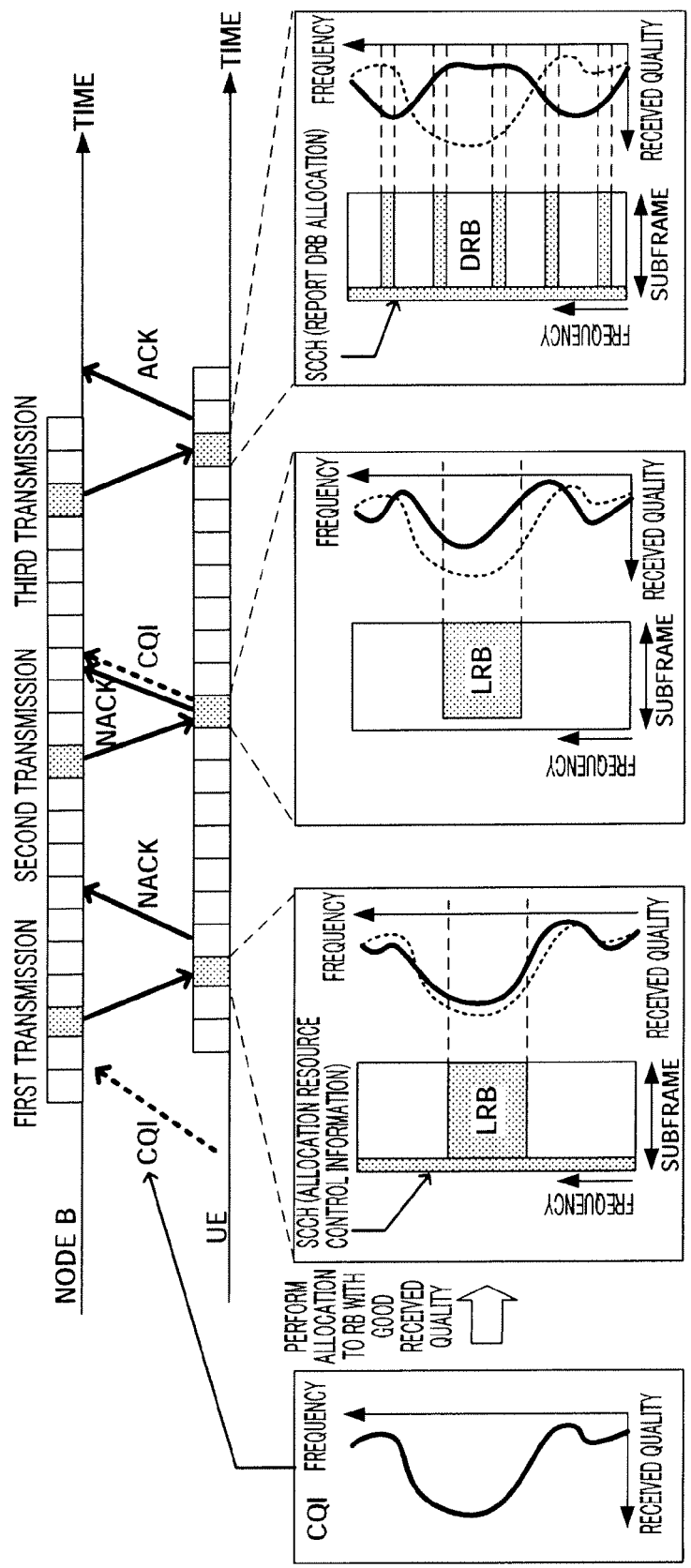
FIG. 16 illustrates a signal transmitted from the radio transmitting apparatus according to Embodiment 2.

FIG. 16 illustrates a signal transmitted from the radio transmitting apparatus according to the present embodiment. Here, the number of retransmissions for reallocation is assumed to be set "2."

In the first transmission, the LRB is selected as the resource allocation scheme based on the CQI fed back from the mobile station, and the RB with the best received quality is allocated to transmission data, according to the LRB scheme. Here, together with the MCS, coding rate, LRB number and DRB number, the number of retransmissions for reallocation is multiplexed on the control channel SCCH and transmitted.

In the second transmission (first retransmission), the number of retransmissions for reallocation is "2," and so multiplexing section 105 allocates the transmission data to the same band (RB) as the first transmission using the same resource allocation scheme (LRB) as in the first transmission.

In the third transmission (second retransmission), the number of retransmissions for reallocation is "2," and so multiplexing section 105 switches to a different resource allocation scheme from the first transmission and the second transmission, reallocates frequency resource and allocates the transmission data to a different RB from the first and second transmission. The DRB number used is reported to the base station via the SCCH.

In this way, the radio transmitting apparatus according to the present embodiment switches the resource allocation scheme from the LRB scheme to the DRB scheme during retransmissions. Therefore, it is possible to reduce control information, increase the combining gain of the retransmission packet by performing reallocation when the frequency scheduling effect upon the first transmission deteriorates, and improve reception performance.

With the present embodiment, it is also possible to adopt a configuration where the LRB is selected again when reallocation is performed. Further, it is also possible to adopt a configuration of selecting which of the LRB and DRB is used every time reallocation is performed. In this case, as shown in FIG. 11, by associating the LRB numbers and DRB numbers, the mobile station can recognize the DRB number to be used from the past LRB number without a report of the DRB number.

The embodiments of the present invention have been described above.

The radio communication system, radio transmitting apparatus and retransmission method according to the present invention are not limited by the above embodiments, and can be implemented with various modifications.

For example, a case has been assumed to explain with the present description where downlink communication from the base station to the mobile station is performed in the communication system of the OFDM scheme, the present invention is also applicable to uplink communication from the mobile station to the base station. In this case, as an uplink communication scheme, other than OFDM, communication schemes such as DFT-OFDM and SC-FDMA, which use the resource allocation schemes of the LRB scheme and DRB scheme, can be applied.

Figure 17:
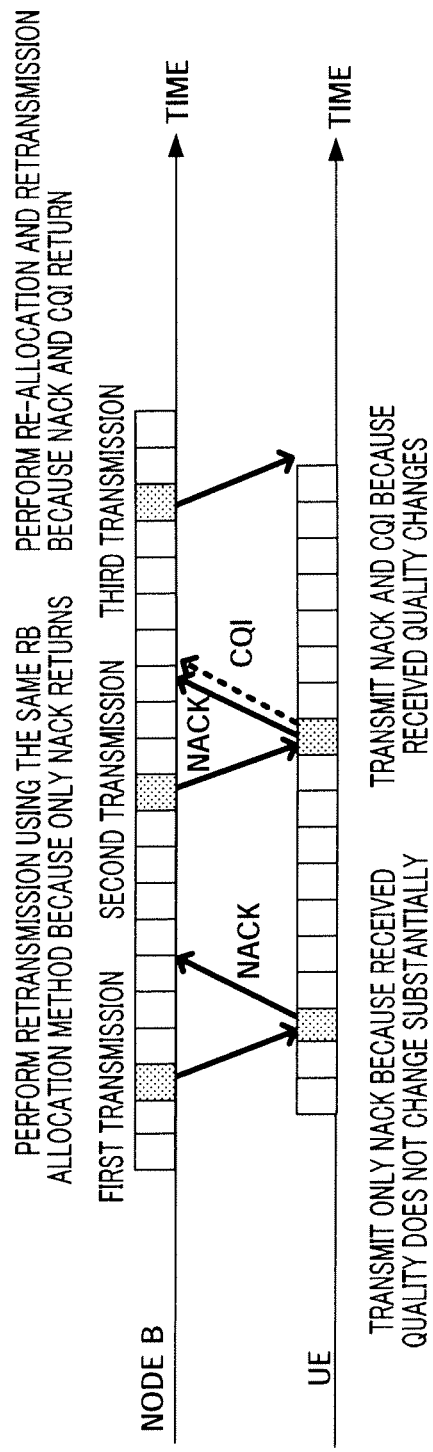
FIG. 17 shows another variation of the present invention.

Further, although a configuration has been described as an example with the present description where the radio transmitting apparatus (base station) determines the resource allocation scheme switching timing or the timing for re-scheduling and reports the result upon the first transmission, the present invention may adopt a configuration where the radio transmitting apparatus switches the resource allocation scheme or performs re-scheduling after receiving a request for switching the resource allocation scheme or request for re-scheduling from the radio receiving apparatus (mobile station). That is, it is also possible to adopt a configuration where, only when the received quality of the allocated band degrades and the resource allocation scheme needs to be switched from the LRB to the DRB, the mobile station requests the base station to, for example, switch the scheme using uplink. By this means, the mobile station can take the initiative of, for example, switching the resource allocation scheme, so that, even when the channel fluctuates significantly, it is possible to respond to this in a simple manner. As a request signal (flag) thereof, instead of adding bits to the uplink control channel, a CQI feedback signal from the mobile station may be substituted. That is, when the CQI is fed back from the mobile station, it is possible to decide that there is a request for, for example, switching the resource allocation scheme, and perform switching. By this means, it is possible to request for, for example, switching without transmitting new control information separately. Further, the CQI only needs to include at least average received quality information of the entire band for the DRB. For example, as shown in FIG. 17, a rule is set that normally only a NACK signal is fed back, and by feeding back the NACK signal and CQI when the received quality of the mobile station degrades, the mobile station requests the base station to perform re-scheduling. By transmitting the NACK and CQI using the same coding block, it is possible to avoid the situation where only the CQI becomes an error.

Further, although the present description has been described focusing on synchronous HARQ, the present invention is not limited to this and can be applied to asynchronous HARQ, that is, HARQ that transmits control information other than the allocation resource information on a per retransmission basis.

Further, although with the present description, control information is reported using the SCCH, a control channel with other names such as a dedicated control channel may be used.

Still further, it is also possible to use as average channel quality, the amount of a shift between the feedback CQI and actual SINR, the amount of degradation of reception performances and the amount of margin with respect to the required received quality, that are caused by channel fluctuation.

Further, the LRB is a channel for performing frequency scheduling transmission and also referred to as a localized channel. On the other hand, the DRB is a channel for performing frequency diversity transmission and also referred to as a distributed channel.

Further, the LRB is normally allocated in subband units or in units of a plurality of consecutive subcarriers. On the other hand, the DRB is configured with a plurality of subcarriers distributed over a wide band of the OFDM symbol, or defined by an FH (Frequency Hopping) pattern. Further, the DRB may also be referred to as an "Intra-TTI frequency hopping." Still further, the DRB may be realized by frequency interleaving.

Further, the radio transmitting apparatus according to the present invention can be mounted on a communication terminal apparatus and base station apparatus in a mobile communication system, so that it is possible to provide a communication terminal apparatus, base station apparatus and mobile communication system that have the same operational effects as described above.

Here, a case where the present invention is implemented by hardware has been explained as an example, but the present invention can also be implemented by software. For example, the functions similar to those of the radio transmitting apparatus according to the present invention can be realized by describing an algorithm of the retransmission method according to the present invention in a programming language, storing this program in a memory and causing an information processing section to execute the program.

Each function block used to explain the above-described embodiments may be typically implemented as an LSI constituted by an integrated circuit. These may be individual chips or may partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application of biotechnology is also possible.

The disclosure of Japanese Patent Application No. 2006-076994, filed on Mar. 20, 2006, including the specification, drawings and abstract, is incorporated herein by reference in its entirety.

INDUSTRIAL APPLICABILITY

The radio transmitting apparatus and retransmission method according to the present invention are applicable to, for example, a communication terminal apparatus and base station apparatus in a mobile communication system.

The invention claimed is:
1. A radio transmitting apparatus comprising:
a selector device, for an orthogonal frequency division multiplexing (OFDM) scheme, that selects a localized resource block scheme, in which frequency resources comprised of subcarriers localized in a frequency domain are allocated to a receiving apparatus, or a distributed resource block scheme, in which frequency resources comprised of subcarriers distributed in the frequency domain are allocated to the receiving apparatus, as a resource allocation scheme;

an allocator device that allocates the frequency resources to the receiving apparatus according to the selected resource allocation scheme and maps transmission data for the receiving apparatus to the frequency resources allocated to the receiving apparatus; and a transmitting device that performs plural transmissions of the transmission data to the receiving apparatus, wherein the selector selects the localized resource block scheme at a first transmission, and switches the resource allocation scheme from the localized resource block scheme to the distributed resource block scheme according to a number of transmissions at a transmission subsequent to the first transmission among the plural transmissions.

2. The radio transmitting apparatus according to claim 1, further comprising a modulator that changes a modulation scheme for the transmission data while the selector switches the resource allocation scheme from the localized resource block scheme to the distributed resource block scheme.

3. The radio transmitting apparatus according to claim 1, wherein the allocator maps the transmission data to the frequency resources comprised of the subcarriers, the frequency resources being distributed in a greater range of the frequency domain when a number of transmissions in the distributed resource block scheme increases.

4. The radio transmitting apparatus according to claim 1, wherein the allocator maps the transmission data to the frequency resources, which are different between transmissions in the distributed resource block scheme.

5. The radio transmitting apparatus according to claim 1, wherein the selector sets a timing for switching of the resource allocation scheme from the localized resource block scheme to the distributed resource block scheme based on a modulation scheme and coding rate of the transmission data.

6. The radio transmitting apparatus according to claim 5, wherein the selector sets an earlier timing for the switching in the same modulation scheme when the coding rate is lower.

7. The radio transmitting apparatus according to claim 1, wherein the selector sets a timing for switching of the resource allocation scheme from the localized resource block scheme to the distributed resource block scheme based on a time elapsed since receiving a channel quality indicator from the receiving apparatus.

8. The radio transmitting apparatus according to claim 1, wherein the selector sets a timing for switching of the resource allocation scheme from the localized resource block scheme to the distributed resource block scheme based on a moving speed of the receiving apparatus.

9. The radio transmitting apparatus according to claim 1, wherein the transmitter transmits information indicating a timing for switching of the resource allocation scheme from the localized resource block scheme to the distributed resource block scheme to the receiving apparatus upon the first transmission.

10. The radio transmitting apparatus according to claim 1, further comprising:

a table that stores a relationship between a plurality of resource allocation methods of the localized resource block scheme and a plurality of resource allocation methods of the distributed resource block scheme, which are associated with each other one-on-one, and that is common between the radio transmitting apparatus and the receiving apparatus, wherein the transmitter transmits, to the receiving apparatus, a resource allocation method to be used out of the plurality of resource allocation methods of the localized resource block scheme.

11. The radio transmitting apparatus according to claim 1, wherein the selector switches the resource allocation scheme from the localized resource block scheme to the distributed resource block scheme when there is a switching request from the receiving apparatus.

12. The radio transmitting apparatus according to claim 11, wherein the selector determines that there is the switching request when a channel quality indicator is fed back from the receiving apparatus at a predetermined timing.

13. A communication terminal apparatus comprising the radio transmitting apparatus according to claim 1.

14. A base station apparatus comprising the radio transmitting apparatus according to claim 1.

15. The radio transmitting apparatus according to claim 1, wherein the selector switches the resource allocation scheme from the localized resource block scheme to the distributed resource block scheme when a channel quality for the distributed resource block scheme becomes greater than a channel quality for the localized resource block scheme.

16. A retransmission method to perform plural transmissions to a receiving apparatus, the retransmission method comprising:

selecting, in an orthogonal frequency division multiplexing (OFDM) scheme, a localized resource block scheme, in which frequency resources comprised of subcarriers localized in a frequency domain are allocated to a receiving apparatus, as a resource allocation scheme at a first transmission, allocating the frequency resources to the receiving apparatus according to the selected resource allocation scheme and mapping transmission data for the receiving apparatus to the frequency resources allocated to the receiving apparatus, performing plural transmissions of the transmission data to the receiving apparatus; and switching the resource allocation scheme from the localized resource block scheme to a distributed resource block scheme, in which frequency resources comprised of subcarriers distributed in the frequency domain are allocated to the receiving apparatus, according to a number of transmissions at a transmission subsequent to the first transmission among the plural transmissions.

* * * * *